(12) United States Patent
Duesterwald et al.

(10) Patent No.: US 8,521,472 B2
(45) Date of Patent: Aug. 27, 2013

(54) METHOD TO COMPUTE WAIT TIME

(75) Inventors: Evelyn Duesterwald, Yorktown Heights, NY (US); Peter K. Malkin, Hawthorne, NY (US); Peter F. Sweeney, Hawthorne, NY (US); Qiming Teng, Beijing (CN); Haichuan Wang, Beijing (CN); Xiao Zhong, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 1013 days.

(21) Appl. No.: 12/562,659

(22) Filed: Sep. 18, 2009

(65) Prior Publication Data
US 2011/0071793 A1    Mar. 24, 2011

(51) Int. Cl.
*G04F 10/00* (2006.01)
*G06F 11/30* (2006.01)

(52) U.S. Cl.
USPC ............ 702/176; 73/865.8; 377/20; 702/182; 702/186

(58) Field of Classification Search
USPC .................... 73/432.1, 865.8; 377/1, 19, 20; 702/1, 85, 89, 127, 176, 182, 183, 186, 187, 702/189; 716/100, 101, 106, 108, 110, 111, 716/113, 132, 134
IPC ....... G04F 10/00; G06F 11/00, 11/30, 11/3065, G06F 11/32, 17/00, 17/40, 19/00
See application file for complete search history.

(56) References Cited

U.S. PATENT DOCUMENTS

| | | | | |
|---|---|---|---|---|
| 4,318,182 A | * | 3/1982 | Bachman et al. | 718/105 |
| 4,791,554 A | * | 12/1988 | Hirota et al. | 1/1 |
| 5,442,763 A | * | 8/1995 | Bartfai et al. | 711/145 |
| 5,835,766 A | * | 11/1998 | Iba et al. | 718/104 |
| 5,958,003 A | * | 9/1999 | Preining et al. | 718/100 |
| 7,185,339 B2 | * | 2/2007 | Srivastava et al. | 718/104 |
| 7,290,259 B2 | * | 10/2007 | Tanaka et al. | 718/1 |
| 8,078,664 B2 | * | 12/2011 | Radia et al. | 709/201 |
| 8,108,874 B2 | * | 1/2012 | Ogasawara et al. | 718/104 |
| 2002/0087611 A1 | * | 7/2002 | Tanaka et al. | 709/1 |
| 2003/0028638 A1 | * | 2/2003 | Srivastava et al. | 709/225 |
| 2004/0103194 A1 | * | 5/2004 | Islam et al. | 709/225 |
| 2008/0295108 A1 | * | 11/2008 | Ogasawara et al. | 718/104 |
| 2009/0177727 A1 | * | 7/2009 | Radia et al. | 709/201 |
| 2009/0288074 A1 | * | 11/2009 | Carroll et al. | 717/158 |
| 2012/0124213 A1 | * | 5/2012 | Radia et al. | 709/226 |

FOREIGN PATENT DOCUMENTS

| EP | 0537509 A2 | * | 4/1993 |
|---|---|---|---|
| JP | 7-191944 A | * | 7/1995 |

* cited by examiner

*Primary Examiner* — Edward Cosimano
(74) *Attorney, Agent, or Firm* — Scully, Scott, Murphy & Presser, P.C.; Louis J. Percello, Esq.

(57) ABSTRACT

A requesting critical wait time of a given resource may be determined. The requesting critical wait time is the time spent by the one or more resources waiting for the given resource, wherein at least one of the resources waiting for the given resource can proceed if access to the given resource is granted. A requested by critical wait time for a resource is determined, the requested by critical wait time being time spent by the resource for waiting solely for the given resource, wherein if the resource were granted access to the given resource, the resource can proceed without further waiting.

18 Claims, 8 Drawing Sheets

New Request Requestee Update Handler

Fig. 1: Critical Wait Time Monitoring Server

Fig. 2: System Logic Flow

Fig. 3: Monitoring Handler

Fig. 4: New Request Requestor Update Handler

Fig. 5: New Request Requestee Update Handler

Fig. 6: Satisfied Request Requestor Update Handler

Fig. 7: Satisfied Request Requestee Update Handler

METHOD TO COMPUTE WAIT TIME

BACKGROUND

The present disclosure relates generally to computer systems, and more specifically to monitoring performance events in a computer system.

Processing of performance events, which occur during normal operation in every execution layer of a computer system can result in performance bottlenecks and/or delays. As software systems become more advanced, the setting of their level of performance becomes increasingly more challenging for software developers. The interactions among different execution layers should be understood to identify and eliminate performance bottlenecks and delays which may occur. An infrastructure for monitoring performance events across execution layers of a system can be used to identify bottlenecks and delays.

One method of detecting performance bottlenecks and delays is to monitor frequency and timing of the events. Monitoring of the events may be interactive which allows dynamic configuration of a monitoring infrastructure. The method of monitoring may provide an Application Programming Interface (API) to enable a tool to be programmed that can generate and process the monitoring information automatically. The API may function as an interface between different execution layers to indicate the occurrence of events for use by the tool to process the event information for analysis. The monitoring and processing of event information may be both offline and online. With offline processing, a stand alone tool can be used that analyzes an event stream that was generated during execution and after the monitoring data was stored. With online processing, a tool can be used that process events as they occur, without storing them, for immediate use to identify online bottlenecks and delays.

Prior art performance monitoring focused on monitoring a single computer component or a single execution layer. For the hardware layer, interfaces have been developed for programming hardware performance counters across different architectures.

For enterprise software layers, an Application Response Measurement (ARM) standard has been developed as a uniform interface to calculate and measure response time and status of work processed by an enterprise software application.

The prior art computes either "computational wait time" as the time a computational resource R is waiting for another resource, or "resource waiting time" as the time a system resource T has computational resources waiting for it. For example, take the case where there are three program threads (computational resources) each waiting for a lock on a database (a system resource). Current systems would either profile the performance of this system by recording the total time each of the threads spends waiting for the lock—the computational wait time; or they would record the total time spent waiting for the database lock—the resource wait time.

What neither of these approaches measures is the time spent waiting that could have actually been spent computing. Suppose in the above example that for any thread to run, there had to be a free core (e.g., a free processor in a parallel computing machine). Suppose now that at one point, all three threads are waiting for the lock, but only threads 1 and 2 have access to a free core. Since thread 3 does not have access to a core, it could not run even if it were granted the lock. Despite this, the wait times for all three threads are measured identically.

What is needed is a system and method that computes critical waiting time, which is the time a given computational resource is waiting for one and only one other resource; e.g., the time the thread could have been computing had it been granted the given lock, since no other resources—like a core—were needed.

Brief Summary

Wait time for one or more resources is computed, for instance, for detecting delays in a computer system. A method for computing wait time, in one aspect, may include detecting a request for a given resource by one or more resources; and computing, using a processor, a requesting critical wait time of the given resource, the requesting critical wait time being time spent by the one or more resources waiting for the given resource, wherein at least one of the resources waiting for the given resource can proceed if access to the given resource is granted.

A system for computing wait time, in one aspect, may include a monitoring module operable to detect a request for a given resource by one or more resources. The monitoring module further may be operable to determine a requesting critical wait time of the given resource, the requesting critical wait time being time spent by the one or more resources waiting for the given resource, wherein at least one of the resources waiting for the given resource can proceed if access to the given resource is granted.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

Figure 1:
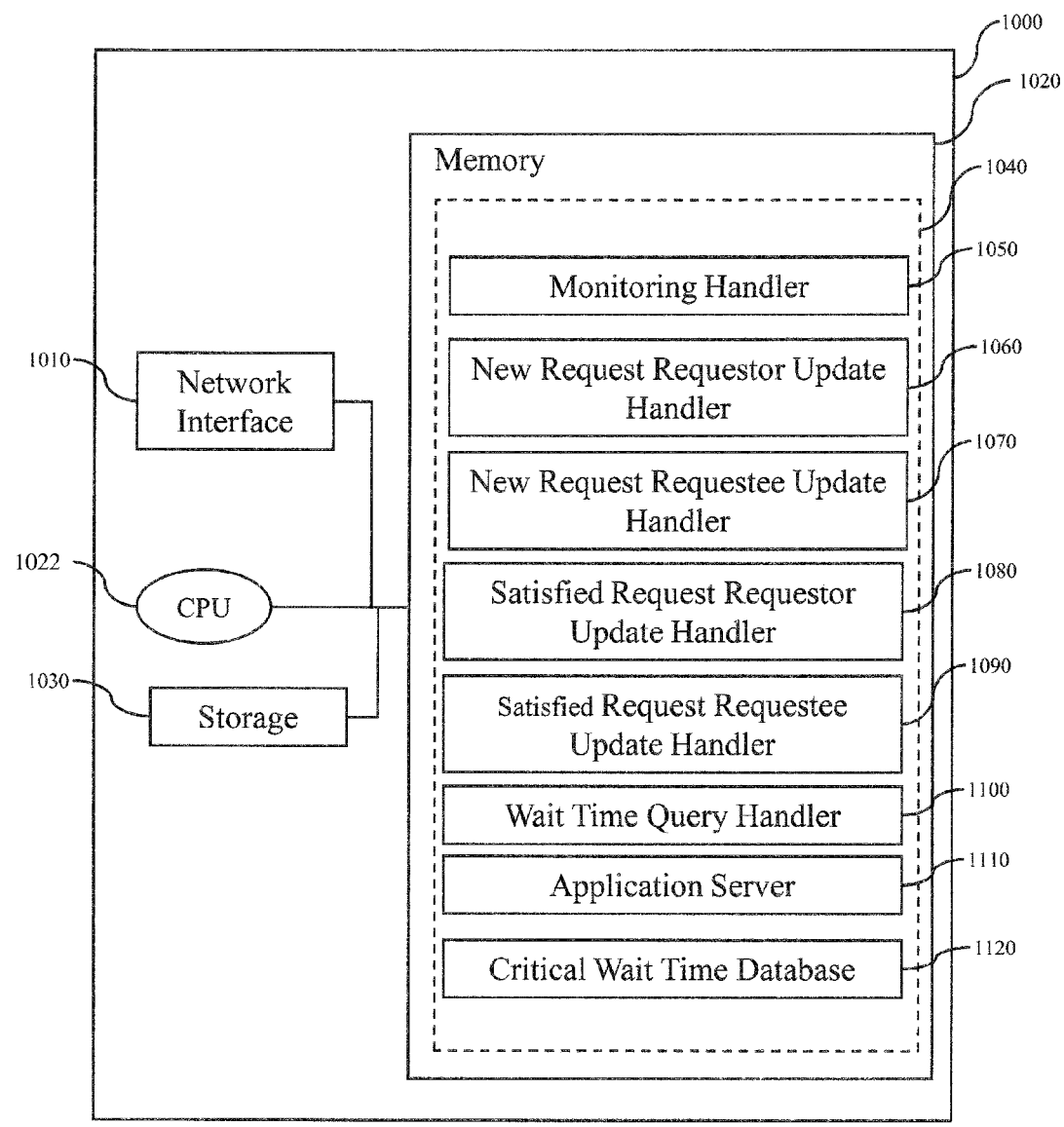
FIG. 1 is a high level block diagram showing an information processing system on one embodiment of the present invention.

A system and method are disclosed which compute critical waiting time. Critical waiting time in the present disclosure refers to the time that a computational resource is waiting on another resource where, if the computational resource had the other resource, then the computational resource can make progress, since it does not need any additional resources. The system and method in one aspect may reduce delay during operation of a computer system and accurately profile its operation.

The system and method of the present disclosure may detect delays in a computer system, for instance, by monitoring all system resources (e.g., locks) that are being requested by one or more computational resources (e.g., threads) and incrementing the critical wait time for any given system resource if the computational resource requesting it would not require any additional system resource if the request were granted.

In a computer system a significant source of performance degradation occurs when multiple threads try to access the same resource at the same time when the resource is guarded by a lock that allows only serial access. When a thread is waiting on a lock, the thread cannot make progress. Traditionally, a performance analyst will determine which locks result in threads waiting for the longest amount of time and the analyst will try to eliminate the lock by using a lock free data structure, or try to reduce the amount of time a thread holds the lock. Using a lock free data structure has its own problems as the overhead to grab the data structure may increase.

Current approaches compute either a computational wait time as the time a computational resource is waiting for another resource, or a resource waiting time as the time that a resource has a computational resource waiting for it. With multi-core systems, there is more than one core that can run a thread. Multi-core systems may allow as many threads as there are cores to make progress in parallel. However, with multi-core systems, not all thread waiting times will affect the performance of a computer system. For example, if a thread is waiting on a lock, but all the cores are busy doing other work, then eliminating the lock time for this waiting thread will not have an effect on performance because the thread cannot make progress until a core becomes available.

In one embodiment of the system and method of the present disclosure, two types of wait time may be computed, for example, to reduce delay during operation of a computer system and to accurately profile its operation: RequestedByCriticalWaitTime(R) computes the time that a resource R is waiting on another resource where, if resource R had the other resource, it could make progress, since it does not need any additional resources; and
RequestingCriticalWaitTime(R) computes the time spent by other resources waiting for resource R, where at least one of the resources waiting for R could make progress if they were given access to R.

The following definitions are used in the present disclosure, for any given resource R:
  CriticalRequestor(R)==true if and when R is only requesting a single other resource; otherwise CriticalRequestor(R)==false. When CriticalRequestor(R)==true, resource R would be able to make progress if it were given access to the resource on which it is waiting because it does not have to wait for anything else.
  Every resource R (both computational (e.g., a thread) and system (e.g., a core)) has at least following four wait times associated with it:
  RequestedByWaitTime(R)—the time spent by resource R waiting for other resources.
  RequestedByCriticalWaitTime(R)—the spent by resource R when it is only waiting for a single other resource, i.e., when CriticalRequestor(R)==true.
  RequestingWaitTime(R)—the time spent by other resources waiting for R.
  RequestingCriticalWaitTime(R)—the time spent by other resources waiting for R when one or more of these resources is a CriticalRequestor (i.e., when CriticalRequestor(the resource)==true.

There also two sets of resources associated with every resource:
  RequestedBy(R) is the set of all resources that are currently being requested by resource R; and
  Requesting(R) is the set of all resources that are currently requesting resource R.

As illustrated and described in detail with references to FIGS. 1-7, the method and system of the present disclosure may compute:
  RequestedByCriticalWaitTime(R)—the (critical) waiting time spent by a resource R (e.g. computational resources, such as a thread) waiting for other resources (e.g., a system resources, such as a core, or another computational resources, such as another thread), where, if the resource R had the other resource, then the resource R can make progress; and
  RequestingCriticalWaitTime(R)—the time spent by other resources (e.g. computational resources, such as a threads) waiting for resource R (e.g., a system resources, such as a core, or another computational resources, such as another thread), where at least one of the resources waiting for R could make progress if they were given access to R.

The following values may be also computed:
  RequestedByWaitTime(R)—the time spent by resource R waiting for other resources; and
  RequestingWaitTime(R)—the time spent by other resources waiting for R.

FIG. 1 shows a block diagram of an example computer server 1000 that may perform the computations for critical waiting times in one embodiment of the present disclosure. This system 1000 may comprise any computing node that is able to load and execute programmatic code, including, but not limited to the ThinkPad® or PowerPC® product sold by IBM, running the operating system and server application suite sold by Microsoft, e.g., Windows® XP, or a Linux operating system. The system logic 1040 may be embodied as computer executable code that is loaded from a remote source (e.g., from a network file system), local permanent optical (CD-ROM), magnetic storage (such as disk), or storage 1030 into memory 1020 for execution by CPU 1022. The server 1000 also may include a network interface 1010, through which the server 1000 can communicate to other network accessible services. Such an interface 1010 may include, but is not limited to a hardwired one, e.g., Ethernet over coax cable, wireless IP, and telephone to IP (VoIP), such as that provided by the DVG-14025 Broadband Phone Service VoIP Router from D-Link®. The memory 1020 may includes computer readable instructions, data structures, program modules and application interfaces forming, for example, the following logical or functional components: a monitoring handler 1050, described in detail with reference to FIG. 3; a new request requestor update handler 1060, described in detail with reference to FIG. 4; a new request requestee update handler 1070, described in detail with reference to FIG. 5; a satisfied request requestor update handler 1080, described in detail with reference to FIG. 6; a satisfied request requestee update handler 1090, described in detail with reference to FIG. 7; a wait time query handler 1100; an application server 1110; and a critical wait time database 1120.

It should be understood that while FIG. 1 illustrates the functional components residing in a server component 1000, the system and method of the present disclosure is not limited only to that configuration. Thus, the components may be distributed over a network on different platforms in a distributed environment, and/or configured in a cloud computing environment. Further, while FIG. 1 shows a CPU 1022, the system may include multiple processors and/or cores.

Referring to FIG. 1, the wait time query handler 1100 responds to requests for wait time related data. In one embodiment of the present invention, these queries are fulfilled using information retrieved from the critical wait time database 1120, where all of the wait time related data computed by the monitoring handler 1050 are stored. Such queries can include requests for any of the four different types of wait time: RequestedByWaitTime(R), RequestedByCriticalWaitTime(R), RequestingWaitTime(R), RequestingCriticalWaitTime(R) for a resource R. A query also can be made for a list of resources, for instance, the list sorted based on one or more of the types of wait time. For example, to determine which resources are spending the most critical time waiting for another resource, one can request a list of all resources with the list sorted based on RequestedByCriticalWaitTime (R). To determine which resources are the most sought after, one can request a list of all resources with the list sorted based on RequestingCriticalWaitTime(R).

As a practical example, suppose that a collection class instance C is identified to have the most critical wait time. To improve the performance of and/or to reduce the bottleneck created by C, C's implementation may be changed, for instance, to be concurrent using a java.util.concurrent class. As another example, suppose that the cores on a machine are identified as having the most critical wait time, then a larger machine with more cores may be implemented, for example, to improve performance.

The application server 1110 is a request generating and satisfying process. These requests are monitored by the monitoring handler 1050. An example of such a server may be an instance of IBM's Websphere™ Server, an Hypertext Transfer Protocol (HTTP) server that accepts and processes HTTP invocations (GETS and PUTS) received via the network interface 1100. The local requests it generates may include requests for data from storage 1030 as well as for computation.

In another aspect, an operating system (OS) or the like may act as a request generator, for instance, when the OS context switches out a thread, e.g., thread T, that was running on a core, e.g., core C. In this case, the request would be resource thread T requesting resource core C, wherein RequestedBy (T) would be updated to add C, and Requesting (C) would be updated to add T. Additional flags and timers associated with this request as described herein would be updated.

The critical wait time database 1120 provides for the creation, deletion and modification of persistent data, and is used by the handlers 1050-1100 of the server 1000. An example of a product providing such function includes IBM™DB/2™ database system. The critical wait time database 1120 could also be embodied as a service running on another machine and accessed via the network interface 1010.

Figure 2:
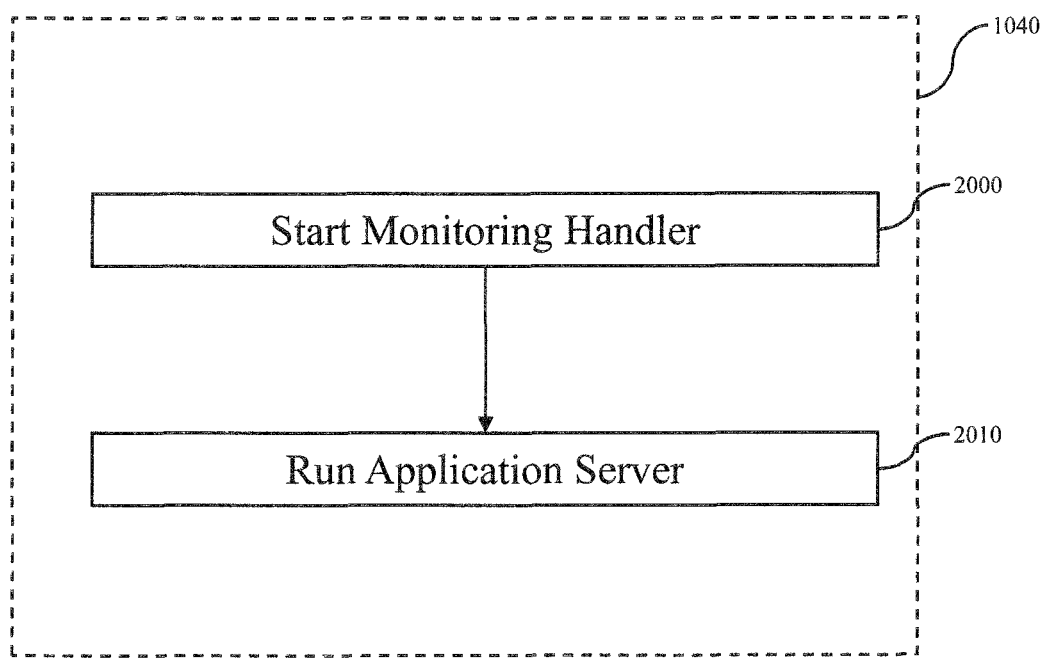
FIG. 2 is a flowchart of an information processing system according to one embodiment of the present invention.

Referring to FIG. 2, there is shown a flow chart illustrating the control flow of the server's logic 1040 in one embodiment of the present disclosure. As shown, in step 2000, the monitoring handler 1050 is started. Following this, in step 2010, the application server 1110 is started, allowing it to generate and satisfy requests.

Figure 3:
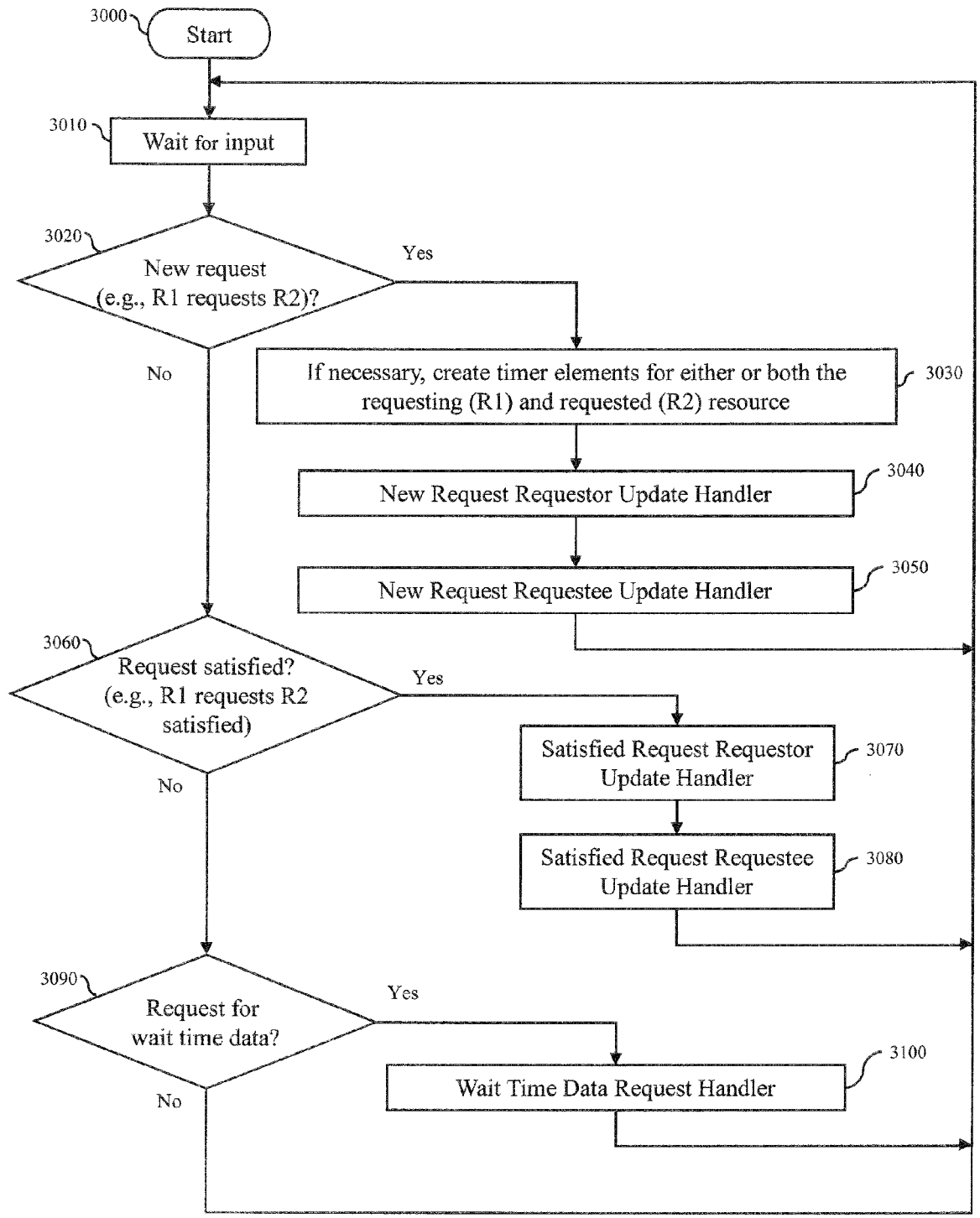
FIG. 3 is a flowchart of the monitoring handler in one embodiment of the present invention.

FIG. 3 illustrates a logical flow of the monitoring handler 1050 in one embodiment. The monitoring handler 1050 monitors all generated requests and satisfied requests related to the application server 1110, computes the wait times, including critical wait times, and receives and responds to requests for information about this wait time data via, for example, the wait time query handler 1100. The monitoring handler 1050 can be accessed both during and after the application server has run, and both run time and post processing analysis of the request wait times can be accomplished.

Referring to FIG. 3, the monitoring handler 1050 begins at step 3000, following which it 1050 waits for input (i.e., a request, the satisfaction of a request, or a request for the wait time query handler 1100) in step 3010. Step 3020 checks whether the input is a new request, e.g., a request by resource R1 for resource R2. If so, then at step 3030, all necessary database elements are created in the critical wait time database 1120 for each of R1 and R2. Any needed timer processes may be also created. Next, at step 3040, the new request requestor update handler 1070 is invoked (e.g., with parameter R1 and R2). At step 3050, the new request requestee update handler 1070 is invoked. Following step 3050, control continues to step 3010.

At 3020, if the input is not a new request, then step 3060 checks whether the input is an indication that a given request (e.g., a request by R1 for R2) had been satisfied. If so, then in step 3070, the satisfied request requestor update handler 1080 is invoked. At step 3080, the satisfied request requestee update handler 1090 is invoked, after which control continues to step 3010.

At 3060, if the request has not been satisfied, 3090 checks whether the input is request for wait time data. At 3090, if the input is a request for wait time data, the wait time data request handler 1100 is invoked in step 3100, following which control continues to step 3010. If input is not a request for wait time data, then control continues at 3010.

Figure 4:
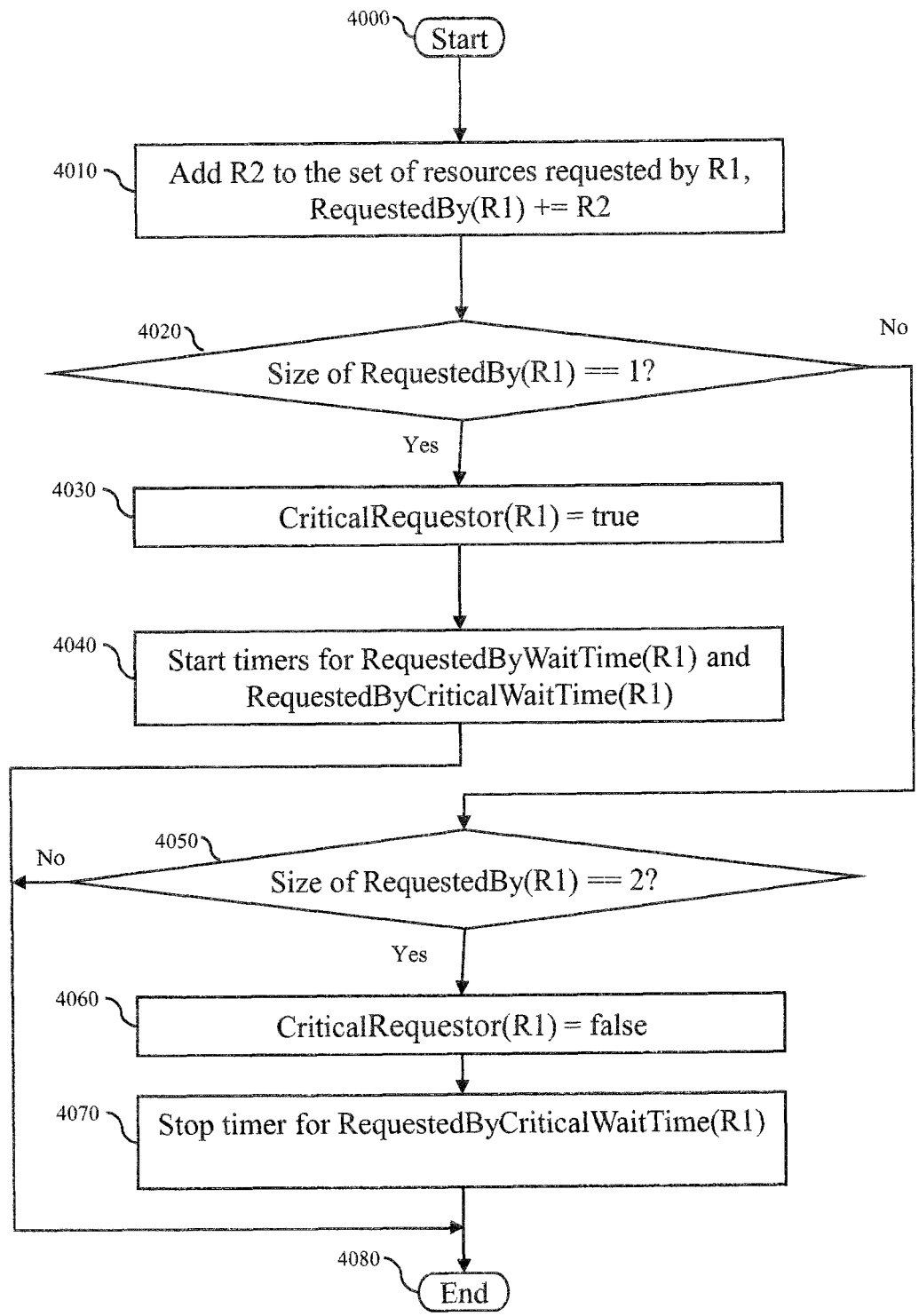
FIG. 4 is a flowchart of the new request requestor update handler in one embodiment of present the invention.

FIG. 4 illustrates a logic flow in one embodiment of the new request requestor update handler 1060. This handler 1060 maintains the RequestedByWaitTime(R1) and RequestedByCriticalWaitTime(R1) for a resource R1 that is requesting other resources, in response to the given resource R1 issuing a new request, e.g., a new request by R1 for R2. As shown, the handler 1060 starts in step 4000. In step 4010, resource R2 is added to the set of resources currently requested by R1:

RequestedBy(R1)+=R2

Step 4020 then checks whether the size of RequestedBy (R1)=1, i.e., R1 is only requesting a single resource. At 4020, if the size of size of RequestedBy(R1) is not equal 1, control passes to step 4050. If the size of size of RequestedBy(R1) is equal 1, then in step 4030 the value of CriticalRequestor(R1) is set=true. Next, in step 4040, the timers for both RequestedByWaitTime(R1) and RequestedByCriticalWaitTime(R1) are started, following which the handler ends at step 4080. If the size of size of RequestedBy(R1) is not equal 1, then it must be greater than 1 since a newly requested resource was just added in step 4010. Step 4050 checks whether the size of RequestedBy(R1)==2 (past the threshold for R1's being a critical requestor). If so, then in step 4060, the value of CriticalRequestor(R1) is set=false, and in step 4070, the timer for RequestedByCriticalWaitTime(R1) is stopped. Following this, the handler 1060 ends in step 4080. If RequestedBy(R1) is not equal to 2, control continues from step 4050 to step 4080 where the handler 1060 ends.

Figure 5:
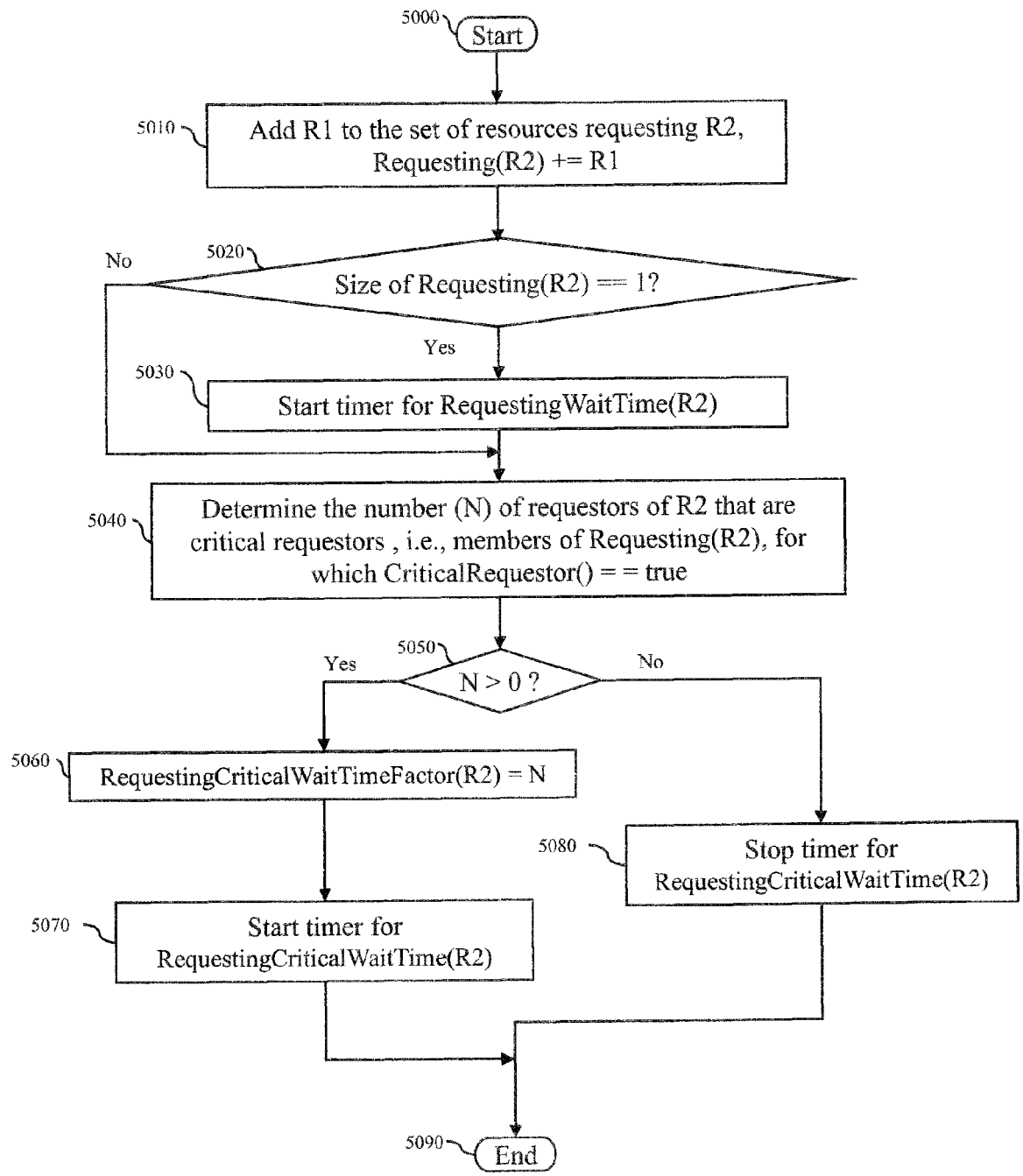
FIG. 5 is a flowchart of the new request requestee update handler in one embodiment of the present invention.

FIG. 5 shows a logic flow in one embodiment of the new request requestee update handler 1070. This handler 1070 maintains the RequestingWaitTime(R2) and RequestingCriticalWaitTime(R2) for a resource R2 that is being requested by other resources, in response to an additional request for the given resource R2 being issued by a new request, e.g., a new request by R1 for R2. As shown, the handler starts in step 5000. In step 5010, resource R1 is added to the set of resources requesting R2:

Requesting(R2)+=R1

Next, step 5020 checks whether the size of Requesting (R2) ==1, which means that this is the only request for R2. If so, then step 5030 starts the timer for RequestingWaitTime (R2). Next, step 5040 checks all of the members of Requesting(R2) and sets N to be the number of the members that are critical requestors (i.e., the number of the members for which CriticalRequestor( )==true). Step 5050 then checks whether N is greater than 0. If so, then step 5060 sets the RequestingCriticalWaitTimeFactor(R2) =N. This is a weighting factor used for allowing an indication that more than one critical requestor is waiting for a given resource. Suppose for example, that there are two system resources Rx and Ry, and that while Rx is being requested by three resources that are critical requestors, Ry is only being requested by one. Then, RequestingCriticalWaitTimeFactor(Rx) =3 while RequestingCriticalWaitTimeFactor(Ry) =1, which means that the critical wait time attributed to Rx be multiplied by three, while Ry's will only be multiplied by 1. Therefore, if 1 second is spent in this state waiting for Rx and Ry, RequestingCriticalWaitTime(Rx) will be incremented by 3, while RequestingCriticalWaitTime(Ry) will only be incremented by 1. The timer for RequestingCriticalWaitTime(R2) is then started in step 5070. This timer using the RequestingCriticalWaitTimeFactor(R2) as a factor for it measurements. The handler then ends at step 5090. If, however, N is not greater than 0, then step 5080 stops the RequestingCriticalWaitTime(R2) timer, following which the handler 1070 ends at step 5090.

Figure 6:
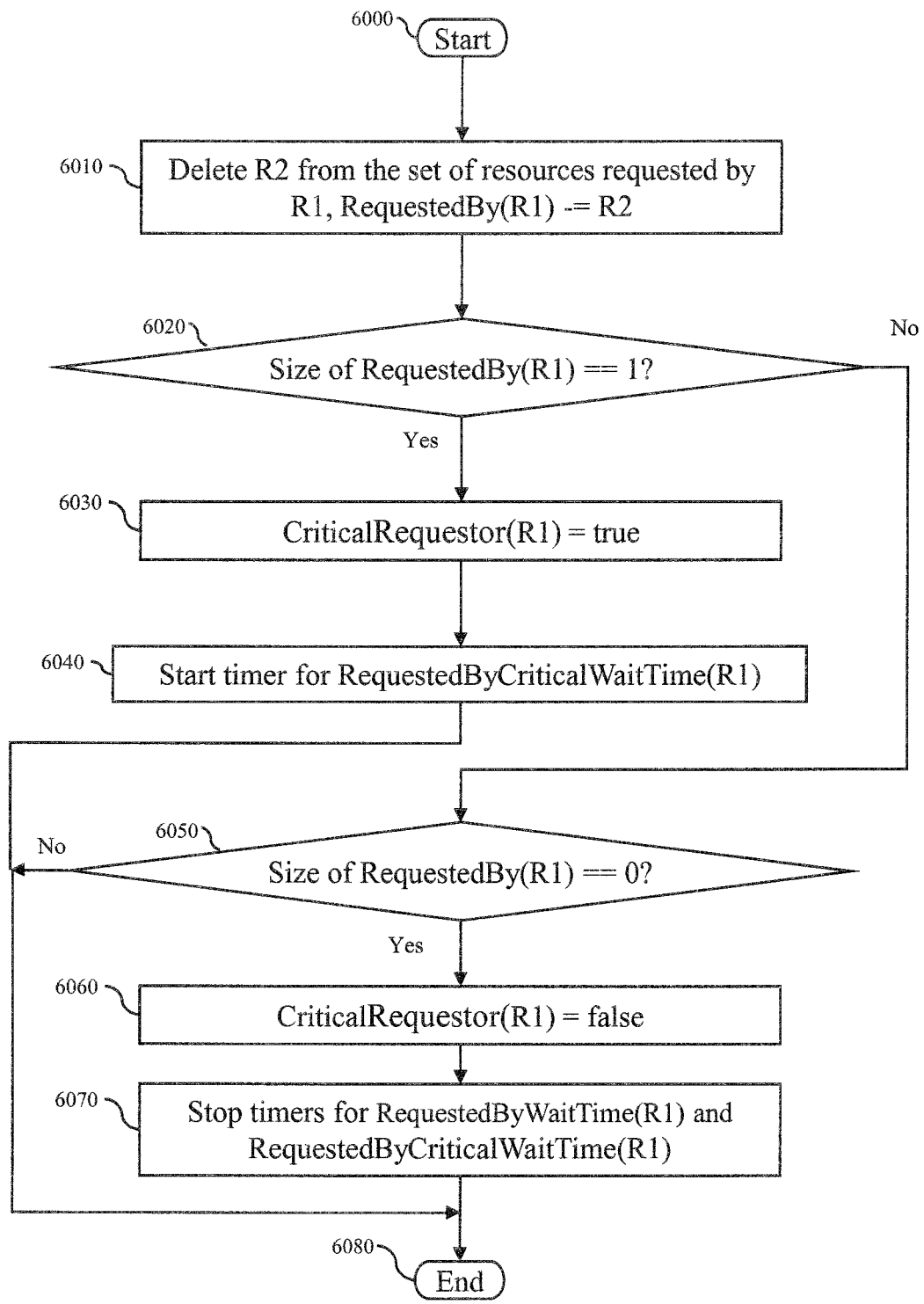
FIG. 6 is a flowchart of the satisfied request requestor update handler in one embodiment of the present invention.

FIG. 6 illustrates a logic flow in one embodiment of the satisfied request requestor update handler 1080. This handler 1080 maintains the RequestedByWaitTime(R1) and RequestedByCriticalWaitTime(R1) for a resource R1 whose request for a resource R2 has been satisfied. The handler 1080 starts in step 6000. Next, in step 6010 resource R2 is deleted from the set of resources currently requested by R1:

RequestedBy(R1)-=R2

Step 6020 then checks whether the size of RequestedBy (R1)==1, i.e., R1 is only requesting a single resource. At 6020, if the size of size of RequestedBy(R1) is not equal 1, control passes to step 6050. If the size of size of RequestedBy (R1) is equal 1, then in step 6030 the value of CriticalRequestor(R1) is set=true. Next, in step 6040, the timer for RequestedByCriticalWaitTime(R1) is started, following which the handler ends at step 6080. Step 6050 checks whether the size of RequestedBy(R1)==0, i.e., R1 is not requesting for any resources. If so, then at step 6060, the value of CriticalRequestor(R1) is set=false, and at step 6070, the timers for both RequestedByWaitTime(R1) and RequestedByCriticalWaitTime(R1) are stopped. Following this, the handler 1080 ends in step 6080. If the size of RequestedBy(R1) is not equal to 0, then control continues from step 6050 to step 6080, where the handler 1080 ends.

Figure 7:
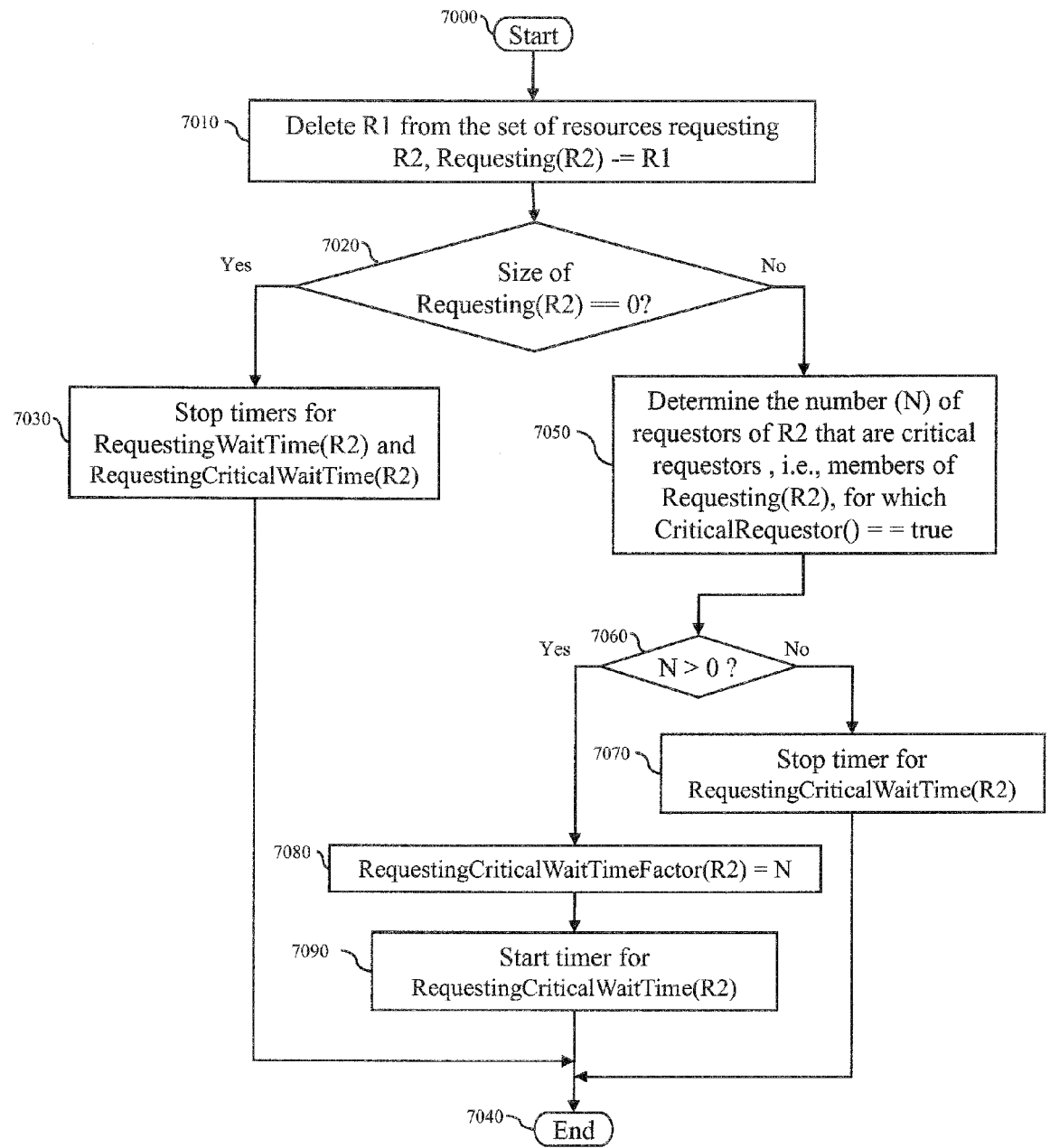
FIG. 7 is a flowchart of the satisfied request requestee update handler in one embodiment of the present invention.

FIG. 7 shows a logic flow of the satisfied request requestee update handler 1090 in one embodiment. This handler 1090 maintains the RequestingWaitTime(R2) and RequestingCriticalWaitTime(R2) for a resource R2 that has had its request for another resource satisfied, e.g., in response to a request for R2 by R1 being satisfied. The handler starts in step 7000. In step 7010, resource R1 is deleted from the set of resources requesting R2:

Requesting(R2)-=R1

Next, step 7020 checks whether the size of Requesting (R 2)==0, which means that there are no current requests for R2. If so, then step 7030 stops both the RequestingWaitTime (R2) and RequestingCriticalWaitTime(R2) timers, following which the handler 1090 ends at step 7040. Stopping a timer that has not been started (i.e., timer that was stopped already) would result in a no action or operation. Another alternative may be to check whether the timer is active before stopping the timer, i.e., instead of performing the stop operation regardless of the timer's state. If at step 7020, however, the size of Requesting(R2) is greater than 0, then step 7050 checks all of the members of Requesting(R2) and sets N to be the number of the members that are critical requestors (i.e., the number of the members for which Critical Requestor( )==true).

Step 7060 then checks whether N is greater than 0. If so, then step 7080 sets the RequestingCriticalWaitTimeFactor (R2) =N. The timer for RequestingCriticalWaitTime(R2) is then started in step 7090, following which the handler 1090 ends at step 7040. If, however, N is not greater than 0, then step 7070 stops the RequestingCriticalWaitTime(R2) timer, following which the handler 1090 ends at step 7040. As described above with reference to FIG. 5, RequestingCriticalWaitTimeFactor is a weighting factor used for allowing an indication that more than one critical requestor is waiting for a given resource. It provides a factor by which the timer should be incremented, every time increment period. Thus, this factor allows for a weighed RequestingCriticalWaitTime wait time. The weight factor may be used to determine how many clones an application server should be vertically cloned by, for example, where a vertical clone replicates the software stack from the JavaTM virtual machine up. For instance, if the weight is 1, then only one clone is needed to eliminate the waiting. If the weight is 5, then 5 clones would be needed.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 8:
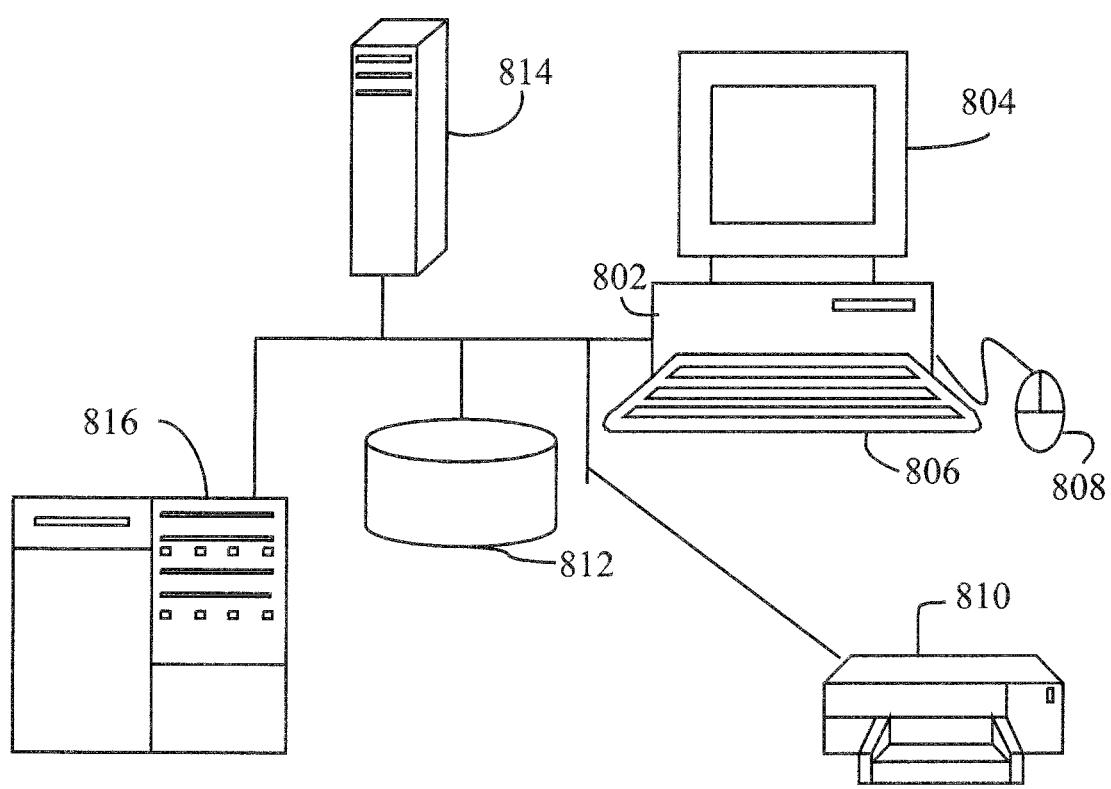
FIG. 8 illustrates an example of a computer system, in which the systems and methodologies of the present disclosure may be carried out or executed.

Referring now to FIG. 8, the systems and methodologies of the present disclosure may be carried out or executed in a computer system that includes a processing unit 802, which houses one or more processors and/or cores, memory and other systems components (not shown expressly in the drawing) that implement a computer processing system, or computer that may execute a computer program product. The computer program product may comprise media, for example a hard disk, a compact storage medium such as a compact disc, or other storage devices, which may be read by the processing unit 802 by any techniques known or will be known to the skilled artisan for providing the computer program product to the processing system for execution.

The computer program product may comprise all the respective features enabling the implementation of the methodology described herein, and which—when loaded in a computer system—is able to carry out the methods. Computer program, software program, program, or software, in the present context means any expression, in any language, code or notation, of a set of instructions intended to cause a system having an information processing capability to perform a particular function either directly or after either or both of the following: (a) conversion to another language, code or notation; and/or (b) reproduction in a different material form.

The computer processing system that carries out the system and method of the present disclosure may also include a display device such as a monitor or display screen 804 for presenting output displays and providing a display through which the user may input data and interact with the processing system, for instance, in cooperation with input devices such as the keyboard 806 and mouse device 808 or pointing device. The computer processing system may be also connected or coupled to one or more peripheral devices such as the printer 810, scanner (not shown), speaker, and any other devices, directly or via remote connections. The computer processing system may be connected or coupled to one or more other processing systems such as a server 816, other remote computer processing system 814, network storage devices 812, via any one or more of a local Ethernet, WAN connection, Internet, etc. or via any other networking methodologies that connect different computing systems and allow them to communicate with one another. The various functionalities and modules of the systems and methods of the present disclosure may be implemented or carried out distributedly on different processing systems (e.g., 802, 814, 816), or on any single platform, for instance, accessing data stored locally or distributedly on the network.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Various aspects of the present disclosure may be embodied as a program, software, or computer instructions embodied in a computer or machine usable or readable medium, which causes the computer or machine to perform the steps of the method when executed on the computer, processor, and/or machine. A program storage device readable by a machine, tangibly embodying a program of instructions executable by the machine to perform various functionalities and methods described in the present disclosure is also provided.

The system and method of the present disclosure may be implemented and run on a general-purpose computer or special-purpose computer system. The computer system may be any type of known or will be known systems and may typically include a processor, memory device, a storage device, input/output devices, internal buses, and/or a communications interface for communicating with other computer systems in conjunction with communication hardware and software, etc.

The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, server. A module may be a component of a device, software, program, or system that implements some "functionality", which can be embodied as software, hardware, firmware, electronic circuitry, or etc.

The embodiments described above are illustrative examples and it should not be construed that the present invention is limited to these particular embodiments. Thus, various changes and modifications may be effected by one skilled in the art without departing from the spirit or scope of the invention as defined in the appended claims.

We claim:

1. A method for computing wait time, comprising:
   detecting a request for a given resource by one or more resources; and
   computing, by a processor, a requesting critical wait time of the given resource, the requesting critical wait time being time spent by the one or more resources waiting for the given resource, wherein at least one of the resources waiting for the given resource can proceed if access to the given resource is granted,
   wherein computing the requesting critical wait time of the given resource comprises:
   adding the one or more resources to a set of resources requesting the given resource;
   determining a weight factor as number of resources in the set of resource, which are waiting solely for the given resource;
   starting a timer associated with the requesting critical wait time, the timer incrementing by the weight factor in every time increment that the timer is running.

2. The method of claim 1, wherein computing the requesting critical wait time of the given resource comprises:
   detecting that the request by the resource for the given resource is satisfied;
   deleting the resource from a set of resources requesting the given resource;
   determining size of the set of resources requesting the given resource;
   stopping the timer associated with the requesting critical wait time of the given resource, if the size of the set of resources requesting the given resource is zero;
   if the size of the set of resources requesting the given resource is greater than zero, performing said determining a weight factor as number of resources in the set of resources requesting the given resource that are waiting solely for the given resource, and if the weight factor is greater than zero, then performing said starting a timer associated with the requesting critical wait time, the timer incrementing by the weight factor in every time increment that the timer is running, otherwise if the weight factor is not greater than zero, stopping the timer associated with the requesting critical wait time.

3. The method of claim 1, further including:
   computing a requested by critical wait time for a resource requesting the given resource, the requested by critical wait time being time spent by the resource for waiting solely for the given resource, wherein if the resource were granted access to the given resource, the resource can proceed without further waiting.

4. The method of claim 3, wherein computing the requested by critical wait time for a resource includes:
   adding the given resource to a set of resources requested by the resource;
   determining size of the set of resources requested by the resource;
   setting a critical requestor flag associated with the resource as true, and starting a timer associated with the requested by critical wait time, if the size of the set of resources requested by the resource is determined to be one;
   setting a critical requestor flag associated with the resource as false, and stopping a timer associated with the requested by critical wait time, if the size of the set of resources requested by the resource is not one.

5. The method of claim 3, wherein computing the requested by critical wait time for a resource includes:
   detecting that the request by the resource for the given resource is satisfied;
   deleting the given resource from a set of resources requested by the resource;
   determining size of the set of resources requested by the resource;
   setting a critical requestor flag associated with the resource to true and starting a timer associated with the requested by critical wait time for the resource, if the size of the set of resources requested by the resource is one;

setting the critical requestor flag associated with the resource to false and stopping the timer associated with the requested by critical wait time for the resource, if the size of the set of resources requested by the resource is zero.

6. The method of claim 3, further including:
storing the requesting critical wait time or the requested by critical wait time, or combinations thereof.

7. The method of claim 6, further including:
receiving one or more queries for information associated with the requesting critical wait time or the requested by critical wait time, or combinations thereof; and
responding to the one or more queries.

8. A system for computing wait time, comprising:
a processor;
a monitoring module operable execute on the processor and to detect a request for a given resource by one or more resources, the monitoring module further operable to determine a requesting critical wait time of the given resource, the requesting critical wait time being time spent by the one or more resources waiting for the given resource, wherein at least one of the resources waiting for the given resource can proceed if access to the given resource is granted, the monitoring module operable to determine the requesting critical wait time by at least adding the one or more resources to a set of resources requesting the given resource, determining a weight factor as number of resources in the set of resource, which are waiting solely for the given resource, and starting a timer associated with the requesting critical wait time, the timer incrementing by the weight factor in every time increment that the timer is running.

9. The system of claim 8, wherein the monitoring module is further operable to determine a requested by critical wait time for a resource requesting the given resource, the requested by critical wait time being time spent by the resource for waiting solely for the given resource, wherein if the resource were granted access to the given resource, the resource can proceed without further waiting.

10. The system of claim 9, further including:
a storage module operable to store one or more of the requesting critical wait time, the requested by critical wait time, or combinations thereof.

11. The system of claim 10, further including:
a wait time query module operable to receive queries associated with the requesting critical wait time, requested by critical wait time, or combinations thereof, the wait time query module further operable to query the storage module and respond to the queries.

12. A non-transitory computer readable storage medium storing a program of instructions executable by a machine to perform a method of computing wait time, comprising:
detecting a request for a given resource by one or more resources; and
determining, using a processor, a requesting critical wait time of the given resource, the requesting critical wait time being time spent by the one or more resources waiting for the given resource, wherein at least one of the resources waiting for the given resource can proceed if access to the given resource is granted,
wherein computing the requesting critical wait time of the given resource comprises:
adding the one or more resources to a set of resources requesting the given resource;
determining a weight factor as number of resources in the set of resource, which are waiting solely for the given resource;
starting a timer associated with the requesting critical wait time, the timer incrementing by the weight factor in every time increment that the timer is running.

13. The non-transitory computer readable storage medium of claim 12, further comprising:
determining a requested by critical wait time for a resource requesting the given resource, the requested by critical wait time being time spent by the resource for waiting solely for the given resource, wherein if the resource were granted access to the given resource, the resource can proceed without further waiting.

14. The non-transitory computer readable storage medium of claim 13, wherein computing the requested by critical wait time for a resource includes:
adding the given resource to a set of resources requested by the resource;
determining size of the set of resources requested by the resource;
setting a critical requestor flag associated with the resource as true, and starting a timer associated with the requested by wait time, if the size of the set of resources requested by the resource is determined to be one;
setting a critical requestor flag associated with the resource as false, and stopping a timer associated with the requested by wait time, if the size of the set of resources requested by the resource is not one.

15. The non-transitory computer readable storage medium of claim 13, wherein computing the requested by critical wait time for a resource includes:
detecting that the request by the resource for the given resource is satisfied;
deleting the given resource from a set of resources requested by the resource;
determining size of the set of resources requested by the resource;
setting a critical requestor flag associated with the resource to true and starting a timer associated with the requested by critical wait time for the resource, if the size of the set of resources requested by the resource is one;
setting the critical requestor flag associated with the resource to false and stopping the timer associated with the requested by critical wait time for the resource, if the size of the set of resources requested by the resource is zero.

16. The non-transitory computer readable storage medium of claim 13, wherein computing the requesting critical wait time of the given resource includes:
detecting that the request by the resource for the given resource is satisfied;
deleting the resource from a set of resources requesting the given resource;
determining size of the set of resources requesting the given resource;
stopping the timer associated with the requesting critical wait time of the given resource, if the size of the set of resources requesting the given resource is zero;
if the size of the set of resources requesting the given resource is greater than zero, performing said determining a weight factor as number of resources in the set of resources requesting the given resource that are waiting solely for the given resource, and if the weight factor is greater than zero, then performing said starting a timer associated with the requesting critical wait time, the timer incrementing by the weight factor in every time increment that the timer is running, otherwise if the weight factor is not greater than zero, stopping the timer associated with the requesting critical wait time.

17. The non-transitory computer readable storage medium of claim 13, further including:
    storing the requesting critical wait time or the requested by critical wait time, or combinations there of.

18. The non-transitory computer readable storage medium of claim 17, further including:
    receiving one or more queries for information associated with the requesting critical wait time or the requested by critical wait time, or combinations there of; and
    responding to the one or more queries.

* * * * *